United States Patent
Doerr

(10) Patent No.: US 8,644,661 B2
(45) Date of Patent: Feb. 4, 2014

(54) PHOTONIC INTEGRATED CIRCUIT WITH A WAVEGUIDE CROSSING STRUCTURE

(75) Inventor: Christopher R. Doerr, Middletown, NJ (US)

(73) Assignee: Alcatel Lucent, Paris (FR)

( * ) Notice: Subject to any disclaimer, the term of this patent is extended or adjusted under 35 U.S.C. 154(b) by 115 days.

(21) Appl. No.: 13/308,006

(22) Filed: Nov. 30, 2011

(65) Prior Publication Data

US 2013/0108208 A1 May 2, 2013

Related U.S. Application Data

(60) Provisional application No. 61/551,759, filed on Oct. 26, 2011.

(51) Int. Cl.
*G02B 6/26* (2006.01)
*G02B 6/42* (2006.01)

(52) U.S. Cl.
USPC .............. 385/44; 385/14; 385/15; 385/16; 385/31; 385/39; 385/43; 385/50

(58) Field of Classification Search
USPC ........................................ 385/43, 44
See application file for complete search history.

(56) References Cited

U.S. PATENT DOCUMENTS 6,925,228 B2 * 8/2005 Kamei et al. .............. 385/37
2008/0023632 A1 * 1/2008 Ridgway et al. ........ 250/338.1

* cited by examiner

*Primary Examiner* — Ryan Lepisto
(74) *Attorney, Agent, or Firm* — Hitt Gaines, PC

(57) ABSTRACT

A photonic integrated circuit comprises a plurality of optical waveguides. Some waveguides cross some other waveguides at respective crossing locations. Some waveguides have varying widths wherein a width of a waveguide at a respective crossing location is smaller than the wavelength of the optical signal.

9 Claims, 3 Drawing Sheets

PHOTONIC INTEGRATED CIRCUIT WITH A WAVEGUIDE CROSSING STRUCTURE

CROSS-REFERENCE TO RELATED APPLICATION

This application claims the benefit of U.S. Provisional Application Ser. No. 61/551,759, filed by Christopher R. Doerr on Oct. 26, 2011, entitled "A PHOTONIC INTEGRATED CIRCUIT WITH A WAVEGUIDE CROSSING STRUCTURE," commonly assigned with this application and incorporated herein by reference.

TECHNICAL FIELD OF THE INVENTION

The present invention is directed, in general, to optical components.

BACKGROUND ART

Photonic integrated circuits (PIC) often comprise a plurality of waveguides. In some cases it may occur that in some circuits one or more waveguides may have to physically cross or pass through one or more waveguides. This may cause in a single device a significant number of waveguide crossings, which in cases may reach up to 50 or more crossings. Such crossings may typically cause excessive loss and crosstalk with respect to the optical signals travelling through such waveguides, in particular if the number of such crossing is significantly high (50 or more).

SUMMARY

While there are several existing solutions in order to solve the problem of crosstalk and/or excessive loss, to the knowledge of the inventor, none of such known solutions is sufficiently suitable to operate with low overall loss and crosstalk, in particular when approximately 50 or more crossings are present and high-index-contrast waveguides are used.

It is therefore desirable to provide a PIC which, while comprising a significant number of waveguide crossings, is capable of operating at low loss and low crosstalk. Desirable values for loss may be less than about 0.05 dB per crossing, and desirable crosstalk values may be less than about −25 dB.

A property known by those skilled in the related art in relation to optical waveguides is that, as the lateral width of such waveguides decreases, the lateral width of the guided mode will get smaller until a point at which the guided mode reaches a certain width, which for the sake of understanding this description may be called a minimum width. By lateral width it is meant to refer to the width that is perpendicular to the propagation direction in the waveguide and in the plane of the integrated optical circuit. For simplification, the lateral width is herein also referred to as the width.

This waveguide width where the mode is at a minimum width is approximately equal to the wavelength of light in the waveguide material. After reaching the minimum width, the width of the guided mode will stop decreasing and start increasing. Therefore, if the width of the waveguide continues to decrease or remains constant, the width of the guided mode continues to become larger than the width of the waveguide.

The inventor has realized that if a guided mode crosses a waveguide when the widths of the both waveguides (the one in which is propagates and the one it crosses) are significantly smaller than the minimum width of the guided mode, and thus the width of the guided mode is significantly larger than the width of those waveguides, then the crossing loss is smaller as compared to the losses expected in circumstances where such guided mode is crossing a waveguide of larger width.

Some embodiments of the present disclosure feature a photonic integrated circuit comprising a plurality of optical waveguides and at least one crossing location between a first optical waveguide and a second optical waveguide, wherein the first optical waveguide is configured to allow propagation of an optical signal, said optical signal having a wavelength when propagating in said optical waveguide, and wherein a width of said first optical waveguide at said crossing location is smaller than said wavelength of the optical signal.

The wavelength of the optical signal when propagating in said optical waveguide is the wavelength in the waveguide material, which is approximately equal to the free-space wavelength of the optical signal divided by the effective index of the waveguide.

According to some specific embodiments the width of said first optical waveguide at said crossing location is smaller than a width of said first optical waveguide at a location other than the crossing location along a length of said first waveguide within about 200 microns of path length from said waveguide crossing.

According to some specific embodiments the first waveguide is configured to allow propagation of the optical signal in a direction of propagation toward said crossing location and wherein along a first length of said first optical waveguide the width of the first optical waveguide decreases in the direction of propagation of said optical signal.

According to some specific embodiments, the first waveguide is configured to guide the optical signal along at least a portion of said first length of the first waveguide wherein a width of said optical signal decreases as the optical signal is guided in said first length of the first waveguide until reaching a point of minimum width of the optical signal, and wherein said width of the optical signal increases as the optical signal propagates past said point of minimum width, and wherein in the direction of propagation, the point of minimum width of the optical signal is located before said crossing location.

According to some specific embodiments, the width of the first waveguide is smaller than the width of the optical signal along a second length of said first waveguide, in a direction of propagation of said optical signal from said crossing location.

According to some specific embodiments, the first optical waveguide has a taper profile transitioning from a first width to a second width wherein the first width is larger than the second width and said taper profile has a linear transition form, or a parabolic transition form or a step-like transition form.

According to some specific embodiments the first optical waveguide has a taper profile transitioning from a first width to a second width wherein the first width is larger than the second width and said taper profile transitioning is from a channel waveguide to a rib waveguide.

A space switch comprising the photonic integrated circuit as featured herein.

A wavelength selective switch comprising the photonic integrated circuit as featured herein.

BRIEF DESCRIPTION OF THE DRAWINGS

For a more complete understanding of the present disclosure, reference is now made to the following description taken in conjunction with the accompanying drawings, in which.

DETAILED DESCRIPTION

Figure 1A:
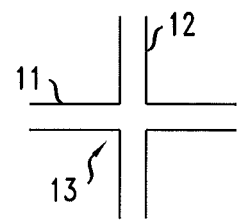
FIGS. 1a and 1b show two exemplary schematic representations of known waveguide crossings.
Figure 1B:
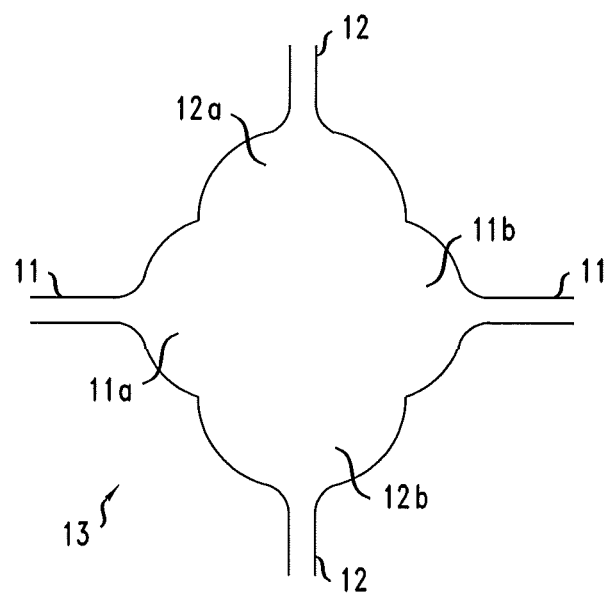

FIGS. 1a and 1b schematically exemplify two waveguide crossings in a simplified representation. The example of FIG. 1a shows optical waveguide 11 and optical waveguide 12 crossing at a crossing location 13. As already discussed above, this arrangement may cause excessive loss and crosstalk with respect to the optical signals travelling through such waveguides 11 and 12.

The known structure shown in FIG. 1b is an attempt to overcome the drawbacks of the structure of FIG. 1a. In this structure, waveguides 11 and 12 cross each other at a crossing location 13. However, as shown in FIG. 1b, in this case the respective widths of the waveguides are increased at or close to the crossing location 13. Therefore, waveguide 11 has increased widths 11a and 11b, and waveguide 12 has increased widths 12a and 12b. Using this configuration, the loss and crosstalk may be reduced because at said crossing location while the width of the mode may increase as it approaches the crossing location 13, the diffraction speed of the mode propagating in the waveguide may be decreased quadratically with the increase in the width of the mode.

However, while this solution contributes to reducing loss and crosstalk as compared to the structure of FIG. 1a, it still suffers from significant limitations in particular when the number of such crossings is significantly high (50 or more).

Figure 2:
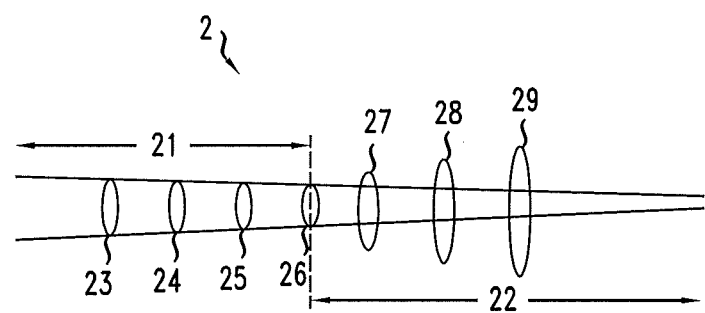
FIG. 2 is an exemplary schematic representation of an effect of a tapered optical waveguide on an optical signal at least partly guided inside said optical waveguide according to some embodiments.

Referring now to FIG. 2, a tapered waveguide 2 is schematically shown where the width of the waveguide varies along the length of the same. In the example shown in FIG. 2, the width of the waveguide 2 decreases from the left of the figure, portion 21, to the right, portion 22. An optical signal is shown by reference numerals 23 through 29. It is therefore assumed that the guided mode is propagating from left to right of the figure.

As shown in the figure the optical signal is guided inside the portion 21 of the waveguide 2 wherein the guided mode follows the width of the waveguide, namely the width of the guided mode is reduced as the width of the optical waveguide is reduced. This is represented by means of reference numerals 23, 24, 25 and 26, which show how the guided mode decreases width in portion 21 along the length of the waveguide 2.

However, as the mode propagates further, despite the reduction in the width of the waveguide 2, from a certain point onward the width of the mode starts to increase. This is schematically represented in FIG. 2 by means of reference numerals 27, 28 and 29 which show how the guided mode increases width in portion 22 along the length of the waveguide 2.

In transition from decreasing width to increasing width, the guided mode reaches a minimum width. Referring to FIG. 2 in the transition from modes 23 to 26, to modes 27 to 29, a minimum width is represented by the reference numeral 26.

As mentioned above, when the width of the waveguide 2 is significantly smaller than the minimum width of the guided mode (as represented in portion 22 of the waveguide 2), then the crossing loss may be significantly smaller as compared to the losses that would be expected in a waveguide of approximately equal or larger width.

This is due to the fact that both the unguided distance that the guided mode must travel and the diffraction speed of the mode are minimized (or substantially reduced).

In other words, the main loss in a waveguide crossing is typically due to diffraction. Therefore when the mode is wider than the waveguide, the mode may diffract more slowly. Therefore a slower diffraction combined with a shorter diffraction region may lead to significantly lower losses.

Typically the crosstalk is caused by scattering light from one waveguide to another. Because the mode becomes wider than the waveguide (as proposed in the present disclosure), the angular spectrum of the mode is narrower, and therefore there is less power being scattered from one waveguide into anther, for example a perpendicular, crossing waveguide.

Figure 3:
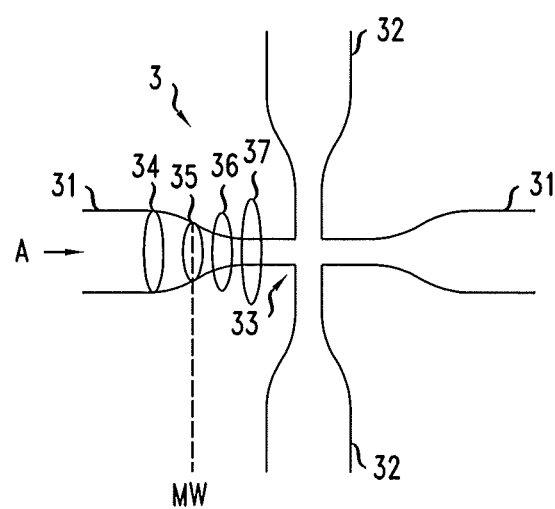
FIG. 3 is an exemplary schematic representation of a waveguide crossing according to some embodiments.

FIG. 3 shows one example of such a structure according to some embodiments of the present disclosure. In this figure waveguides 31 and 32 are shown to cross at waveguide crossing location 33. The width of the waveguides 31 and 32 is reduced (narrowed) as they approach the crossing location 33.

According to some embodiments of the disclosure, the structure of the waveguide crossing is designed such that the point at which the guided mode reaches its minimum width (and starts to increase width afterwards) is located before the crossing location in the direction of propagation of the mode.

Referring back to FIG. 3, assuming that an optical signal is propagating inside the waveguide 31 in the direction of propagation shown by arrow A, the width of the guided mode inside the waveguide 31 is decreased as the signal propagates as shown by means of reference numerals 34 and 35. The optical mode then reaches its minimum width at point MW corresponding to the width shown by means of reference numeral 35. After the minimum width point MW, the width of the optical mode starts to increase as shown by means of the reference numerals 36 and 37.

In this manner, and as already explained in relation to FIG. 2, as the optical mode crosses the crossing location 33, the losses caused by such crossing will be significantly lower than those produced with comparable prior art devices.

Some non-limiting examples of shapes for the taper profiles of the waveguide that transition from the wide waveguide to the narrow waveguide may be linear, parabolic, or any shape that is known in the art for tapering from one width to another in a waveguide. The taper profile may even consist of abrupt steps (step-like transition) that are designed to taper in a short distance with low loss. A combination of such transition profile may also be used as long as such combination is compatible and/or complimentary.

Preferably the width of the optical waveguide in which the optical mode propagates transitions from a wider width (or widths) to a narrower width (or widths), in any convenient transition format as stated above, such that the width of said optical waveguide at the waveguide crossing location is smaller than the width of the waveguide at a location other than the waveguide crossing location along the length of said waveguide in which the optical mode propagates, within about 200 microns of path length from said waveguide crossing location.

Figure 4:
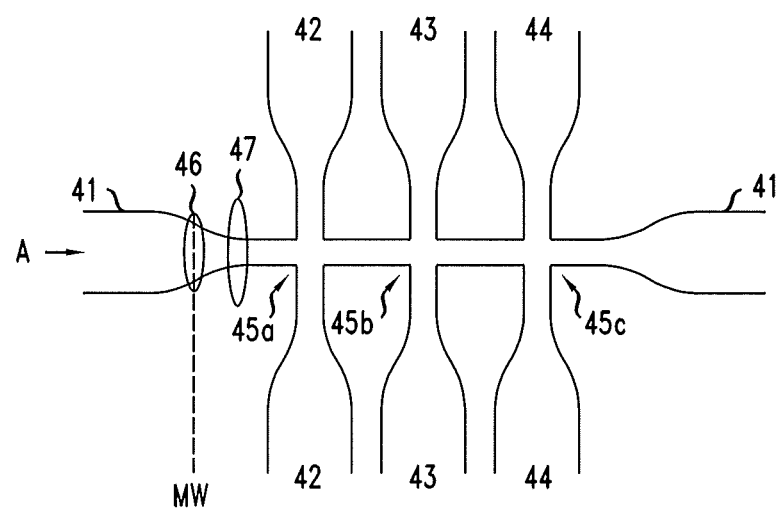
FIG. 4 is an exemplary schematic representation of a plurality of crossings between a plurality of optical waveguides according to some embodiments.

FIG. 4 is an exemplary schematic representation of a plurality of waveguide crossings between a plurality of optical waveguides according to some embodiments. The structure of the waveguide crossing in this example is similar to that of FIG. 3 with the exception that in FIG. 4, the waveguide 41 is shown to cross various waveguides 42, 43 and 44 at various crossing locations 45a, 45b and 45c. Assuming that the optical mode is propagating in the direction of arrow A, the minimum width 46 of the guided mode is reached at minimum width point MW. From that minimum width point MW onward, the width of the signal increases as shown by means of reference numeral 47 as the signal propagates in the direction of arrow A.

It is noted that a very narrow waveguide may exhibit excessive propagation loss due to sidewall roughness of the waveguide, because the optical field is large at the sidewalls. Should this be the case, one may opt for transitioning the shape of the waveguide from a channel waveguide to a rib waveguide thereby achieving a sub minimum-guided-mode width. This is because a rib waveguide has a lower effective lateral index contrast between core and cladding, and thus roughness in the sidewalls scatters less of the light.

Figure 5:
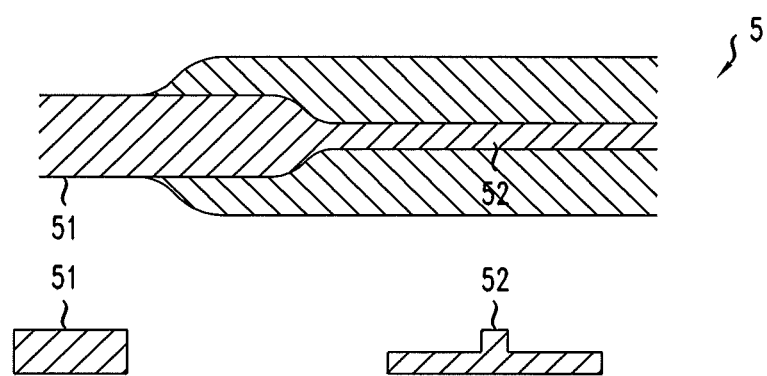
FIG. 5 shows exemplary schematic top and side views of a waveguide transition structure according to some embodiments.

FIG. 5 shows exemplary schematic top and side views of a waveguide structure 5 wherein a waveguide 51-52 is shown to transition from a channel waveguide form 51 to a rib waveguide form 52, reducing its effective lateral index contrast. Losses less than 0.05 dB per crossings are readily achievable for high-index contrast silicon nitride waveguides, for example.

The photonic integrated circuit as featured herein may be used in a variety of optical devices, for example in a space switch or in a wavelength selective switch.

What is claimed is:

1. A photonic integrated circuit comprising:
   a plurality of optical waveguides; and
   at least one crossing location between a first optical waveguide and a second optical waveguide,
   wherein the first optical waveguide is configured to allow propagation of an optical signal, said optical signal having a wavelength when propagating in said optical waveguide, and wherein a width of said first optical waveguide at said crossing location is smaller than said wavelength of the optical signal, wherein the width of said first optical waveguide at said crossing location is smaller than a width of said first optical waveguide at a location other than the crossing location along a length of said first waveguide within about 200 microns of path length from said waveguide crossing.

2. The photonic integrated circuit of claim 1, wherein the first optical waveguide has a taper profile transitioning from a first width to a second width wherein the first width is larger than the second width and said taper profile has a linear transition form.

3. The photonic integrated circuit of claim 1, wherein the first optical waveguide has a taper profile transitioning from a first width to a second width wherein the first width is larger than the second width and said taper profile has a parabolic transition form.

4. The photonic integrated circuit of claim 1, wherein the first optical waveguide has a taper profile transitioning from a first width to a second width wherein the first width is larger than the second width and said taper profile has a step-like transition form.

5. A space switch comprising the photonic integrated circuit as claimed in claim 1.

6. A wavelength selective switch comprising the photonic integrated circuit as claimed in claim 1.

7. A photonic integrated integrated circuit comprising:
   a plurality of optical waveguides; and
   at least one crossing location between a first optical waveguide and a second optical waveguide,
   wherein the first optical waveguide is configured to allow propagation of an optical signal, said optical signal having a wavelength when propagating in said optical waveguide, and wherein a width of said first optical waveguide at said crossing location is smaller wavelength of the optical signal,
   wherein the first waveguide is configured to allow propagation of the optical signal in a direction of propagation toward said crossing location and wherein along a first length of said first optical waveguide the width of the first optical waveguide decreases in the direction of propagation of said optical signal, and
   wherein the first waveguide is configured to guide the optical signal along at least a portion of said first length of the first optical waveguide, wherein a width of said optical signal decreases as the optical signal is guided in said first length of the first optical waveguide until reaching a point of minimum width of the optical signal, and wherein said width of the optical signal increases as the optical signal propagates past said point of minimum width, and wherein in the direction of propagation, the point of minimum width of the optical signal is located before said crossing location.

8. The photonic integrated circuit of claim 7, wherein, the width of the first optical waveguide is smaller than the width of the optical signal along a second length of said first optical waveguide, in a direction of propagation of said optical signal from said crossing location.

9. A photonic integrated circuit comprising:
   a plurality of optical waveguides; and
   at least one crossing location between a first optical waveguide and a second optical waveguide,
   wherein the first optical waveguide is configured to allow propagation of an optical signal, said optical signal having a wavelength when propagating in said optical waveguide, and wherein a width of said first optical waveguide at said crossing location is smaller than said wavelength of the optical signal, wherein the first optical waveguide has a taper profile transitioning from a first width to a second width wherein the first width is larger than the second width and said taper profile transitioning is from a channel waveguide to a rib waveguide.

* * * * *